US012701618B2

(12) United States Patent
Silverman et al.

(10) Patent No.: US 12,701,618 B2
(45) Date of Patent: Aug. 4, 2026

(54) AVOIDING UPLINK ORTHOGONAL FREQUENCY DIVISION MULTIPLE ACCESS-BASED RANDOM ACCESS (UORA) COLLISIONS

(71) Applicant: Cisco Technology, Inc., San Jose, CA (US)

(72) Inventors: Matthew A. Silverman, Shaker Heights, OH (US); Ardalan Alizadeh, Campbell, CA (US); Peiman Amini, Fremont, CA (US); Sivadeep R. Kalavakuru, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 324 days.

(21) Appl. No.: 18/608,705

(22) Filed: Mar. 18, 2024

(65) Prior Publication Data

US 2025/0203661 A1      Jun. 19, 2025

Related U.S. Application Data

(60) Provisional application No. 63/610,330, filed on Dec. 14, 2023.

(51) Int. Cl.
*H04W 74/0833*        (2024.01)
(52) U.S. Cl.
CPC ............................... *H04W 74/0833* (2013.01)
(58) Field of Classification Search
CPC .................................................. H04W 74/0833
See application file for complete search history.

(56) References Cited

U.S. PATENT DOCUMENTS

| 10,708,958 | B2 * | 7/2020 | Ryu | ..................... H04W 74/085 |
| 10,735,151 | B2 * | 8/2020 | Kim | ...................... H04L 5/0053 |

(Continued)

FOREIGN PATENT DOCUMENTS

| JP | 2017147509 A | 8/2017 | |
| WO | WO-2020080786 A1 * | 4/2020 | ............... H04L 1/06 |

(Continued)

OTHER PUBLICATIONS

Kedem et al., UORA Enhancements to address RTA, Dec. 2020, www.ieee80211.org, document: IEEE 802.11-20-1902/r0 (Year: 2020).*

(Continued)

*Primary Examiner* — Eric Nowlin
(74) *Attorney, Agent, or Firm* — Patterson + Sheridan, LLP

(57)        ABSTRACT

Techniques and apparatus for avoiding uplink orthogonal frequency division multiple access (OFDMA)-based random access (UORA) collisions for uplink transmissions are described. An example technique includes obtaining, by a wireless device, information indicating (i) a UORA resource unit (RU) assigned to a multi-user (MU) group including the wireless device and (ii) a number of spatial streams associated with the MU group. A respective user position associated with the wireless device within the MU group is determined from multiple user positions. A spatial stream of the number of spatial streams is selected based on the user position. Uplink data is transmitted on the UORA RU using the spatial stream.

20 Claims, 8 Drawing Sheets

100

(56) References Cited

U.S. PATENT DOCUMENTS

| | | | | |
|---|---|---|---|---|
| 11,729,824 | B2 * | 8/2023 | Nezou | H04W 74/0808 |
| | | | | 370/329 |
| 11,812,472 | B2 * | 11/2023 | Patil | H04W 74/006 |
| 12,356,463 | B2 * | 7/2025 | Sun | H04L 5/0044 |
| 12,457,640 | B2 * | 10/2025 | Nezou | H04W 74/0808 |
| 12,538,291 | B2 * | 1/2026 | Xia | H04W 72/121 |
| 2016/0156396 | A1 | 6/2016 | Stacey et al. | |
| 2017/0094664 | A1 | 3/2017 | Lee et al. | |
| 2017/0223665 | A1 | 8/2017 | Chun et al. | |
| 2018/0310342 | A1 * | 10/2018 | Patil | H04W 74/006 |
| 2019/0268850 | A1 * | 8/2019 | Kim | H04W 74/08 |
| 2020/0107363 | A1 * | 4/2020 | Nezou | H04W 74/0808 |
| 2021/0029747 | A1 * | 1/2021 | Patil | H04W 74/006 |
| 2021/0399838 | A1 * | 12/2021 | Lou | H04L 1/1812 |
| 2022/0330344 | A1 * | 10/2022 | Lou | H04L 1/1893 |
| 2023/0081928 | A1 * | 3/2023 | Park | H04L 27/2613 |
| | | | | 370/329 |
| 2023/0105640 | A1 * | 4/2023 | Park | H04L 27/262 |
| | | | | 370/329 |
| 2023/0122711 | A1 * | 4/2023 | Sun | H04W 74/0833 |
| | | | | 370/329 |
| 2023/0130228 | A1 * | 4/2023 | Park | H04L 1/0045 |
| | | | | 370/329 |
| 2023/0156687 | A1 * | 5/2023 | Xia | H04W 72/121 |
| | | | | 370/329 |
| 2023/0171140 | A1 * | 6/2023 | Park | H04L 1/00 |
| | | | | 370/338 |
| 2023/0276415 | A1 * | 8/2023 | Ko | H04W 72/0453 |
| | | | | 370/329 |
| 2023/0284290 | A1 | 9/2023 | Lanante et al. | |
| 2023/0345531 | A1 * | 10/2023 | Nezou | H04W 74/0808 |
| 2024/0073966 | A1 * | 2/2024 | Patil | H04W 74/06 |
| 2024/0114546 | A1 * | 4/2024 | Huang | H04W 74/002 |
| 2024/0155697 | A1 * | 5/2024 | Ding | H04B 7/06952 |
| 2024/0292463 | A1 * | 8/2024 | Kim | H04W 74/006 |
| 2024/0324030 | A1 * | 9/2024 | Chitrakar | H04W 74/0833 |
| 2024/0381430 | A1 * | 11/2024 | Smith | H04W 74/006 |

FOREIGN PATENT DOCUMENTS

| | | | | |
|---|---|---|---|---|
| WO | WO-2020097441 A1 * | 5/2020 | | H04L 1/1822 |
| WO | WO-2022148234 A1 * | 7/2022 | | H04W 28/10 |
| WO | 2022191772 A1 | 9/2022 | | |
| WO | 2023287350 A2 | 1/2023 | | |
| WO | WO-2023091864 A1 * | 5/2023 | | H04W 84/12 |

OTHER PUBLICATIONS

Ding et al., Enhanced UORA, Mar. 12, 2021, www.ieee80211.org, document: IEEE 802.11-21/0400r1 (Year: 2021).*

Ko et al., LB266 CR for UORA, Sep. 9, 2022, www.ieee80211.org, document: IEEE 802.11-22/1565r0 (Year: 2022).*

International Search Report and Written Opinion for International Application No. PCT/US2024/060107, mailed Mar. 3, 2025, 21 Pages.

Cheng R-G., et al., "Uplink OFDMA-Based Random Access Mechanism With Bursty Arrivals for IEEE 802.11ax Systems", IEEE Networking Letters, vol. 4, No. 1, Mar. 2022, pp. 34-38.

* cited by examiner

600

Enter

605

Assign a MU group to a UORA RU for an uplink transmission

610

Determine, for each user of the MU group, a respective user position within the UORA RU

615

Provide an indication of the user positions to the MU group

Exit

700

AVOIDING UPLINK ORTHOGONAL FREQUENCY DIVISION MULTIPLE ACCESS-BASED RANDOM ACCESS (UORA) COLLISIONS

CROSS-REFERENCE TO RELATED APPLICATIONS

This application claims benefit of U.S. Provisional Patent Application Ser. No. 63/610,330 filed Dec. 14, 2023. The aforementioned related patent application is herein incorporated by reference in its entirety for all applicable purposes.

TECHNICAL FIELD

Embodiments presented in this disclosure generally relate to wireless communications. More specifically, embodiments disclosed herein relate to techniques for mitigating random access collisions for uplink transmissions.

BACKGROUND

In certain wireless networks (e.g., Institute of Electrical and Electronic Engineers (IEEE) 802.11ax, 802.11be, 802.11bn, etc.), uplink (UL) access to the wireless medium is achieved through scheduled triggering of traffic that is initiated by the access point (AP). This access model generally relies on the AP scheduling clients to send uplink traffic at a specified time.

However, there are several scenarios where stations (STAs) may not use scheduled/triggered access to the medium. Such scenarios may include a very crowded wireless local area network (WLAN) and cases where a STA urgently needs to transmit and cannot wait for the next available transmission opportunity (TXOP), as illustrative, non-limiting examples. In these scenarios, while it may be preferable to still use triggers for UL traffic, certain STAs may perform random access to the medium using UL orthogonal frequency division multiple access (OFDMA)-based random access (UORA).

UORA has similar properties to legacy enhanced distributed channel access (EDCA), where STAs contend for access to the medium. One key difference between UORA and EDCA is that STAs do not have access to the entire medium with UORA. Instead, with UORA, STAs have access to a subset of resource units (RUs) that have been allocated by the AP for random/contention-based access to the medium.

One potential drawback to UORA is that any device may choose to jump on (or access) one of the random access (RA) RUs and collide with another STA (e.g., as a result of classic contention). As an example, such a scenario may occur when there are a large number of devices that want to transmit at the same time.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
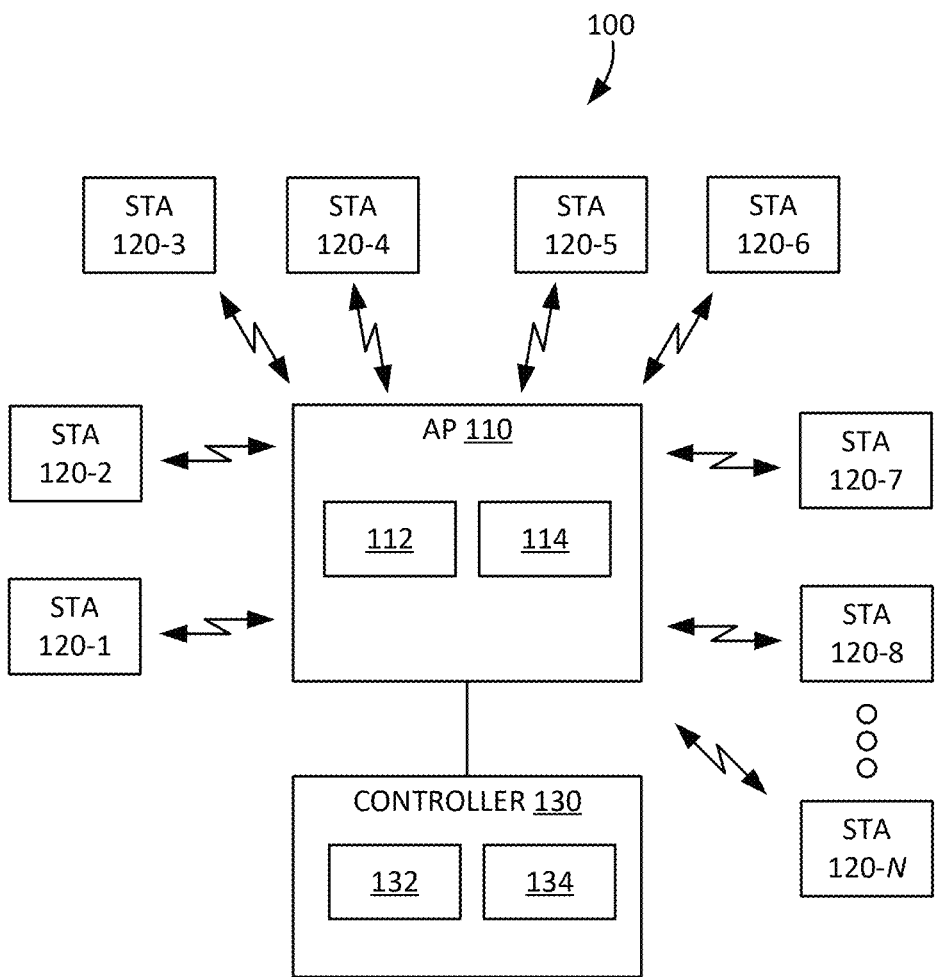
FIG. 1 illustrates an example network according to one embodiment.

One embodiment described herein is a computer-implemented method performed by a wireless device. The computer-implemented method includes obtaining information indicating (i) an uplink orthogonal frequency division multiple access (OFDMA)-based random access (UORA) resource unit (RU) assigned to a multi-user (MU) group. The MU group includes the wireless device and (ii) a number of spatial streams associated with the MU group. The computer-implemented method also includes determining, from a plurality of user positions, a respective user position associated with the wireless device within the MU group. The computer-implemented method also includes selecting a first spatial stream of the number of spatial streams, based on the user position. The computer-implemented method further includes transmitting uplink data on the UORA RU using the first spatial stream.

Another embodiment described herein is a wireless device. The wireless device includes one or more memories collectively storing instructions, and one or more processors communicatively coupled to the one or more memories. The one or more processors are collectively configured to execute the instructions to cause the wireless device to perform an operation. The operation includes obtaining information indicating (i) an uplink orthogonal frequency division multiple access (OFDMA)-based random access (UORA) resource unit (RU) assigned to a multi-user (MU) group of users. The MU group includes the wireless device and (ii) a number of spatial streams associated with the MU group of users. The operation also includes determining, from a plurality of user positions, a respective user position associated with the wireless device within the MU group. The operation also includes selecting a first spatial stream of the number of spatial streams, based on the user position. The operation further includes transmitting uplink data on the UORA RU using the first spatial stream.

Another embodiment described herein is a computer-implemented method performed by a network entity. The computer-implemented method includes assigning a multi-user (MU) group to an uplink orthogonal frequency division multiple access (OFDMA)-based random access (UORA) resource unit (RU) for an uplink transmission. The computer-implemented method also includes determining, for each user of the MU group, a respective user position within the UORA RU. The computer-implemented method further includes providing an indication of the user positions to the MU group.

Other embodiments provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein.

Example Embodiments

Embodiments herein provide techniques and apparatus for mitigating (and, in some cases, avoiding) UORA collisions for uplink transmissions, such as UL multi-user, multiple-input, multiple-output (MU-MIMO) transmissions. Certain embodiments herein may use signaled access to control the number of STAs as well as which STAs are permitted to use UORA to access the medium. For example, certain embodiments may provide an augmentation to UORA based on signaled access to the medium to avoid excessive collisions from random access on a per-RU-basis.

Advantageously, the techniques described herein can significantly improve the communication performance (e.g., increased throughput, lower latency, lower interference, etc.) of devices within a wireless network by reducing the likelihood of collisions on UORA RUs.

Note, the techniques described herein for mitigating (and, in some cases, avoiding) UORA collisions for uplink transmissions in a wireless network may be incorporated into (such as implemented within or performed by) a variety of wired apparatuses (or nodes), wireless apparatuses (or nodes), or a combination thereof. A wireless node may provide, for example, connectivity to or from a network (such as a wide area network (WAN) such as the Internet or a cellular network) via a wired or wireless communication link. In some implementations, a wireless node may include an AP or a STA.

FIG. 1 illustrates an example network 100 in which one or more techniques described herein can be implemented, according to one embodiment. In certain embodiments, the network 100 is configured as an IEEE 802.11 wireless local area network (WLAN), which can be connected with a wide area network (WAN), such as the Internet. As shown, the network 100 includes, without limitation, an AP 110 and multiple STAs 120-1 to 120-N (collectively referred to as STAs 120) associated with the AP 110.

An AP is generally a fixed station that communicates with STA(s) and may be referred to as a base station, wireless device, an AP STA, or some other terminology. A STA may be fixed or mobile and also may be referred to as a mobile STA, a client, a client STA, a wireless device, a non-AP STA, or some other terminology. A given STA can be, without limitation, a smartphone, tablet, laptop, augmented reality (AR) headset, virtual reality (VR) headset, mixed reality (MR) headset, extended reality (XR) headset, computer, smartwatch, Internet of Things (IoT) device, or any other electronic device configured to communicate wirelessly with the AP 110. Note that while a certain number of APs and STAs are depicted, the network 100 may include any number of APs and STAs.

The AP 110 may manage and/or wirelessly serve the STAs 120. For example, AP 110 may communicate with one or more STAs 120 on the downlink and uplink. The downlink (e.g., forward link) is the communication link from the AP 110 to the STA(s) 120, and the uplink (e.g., reverse link) is the communication link from the STA(s) 120 to the AP 110. In some cases, a STA may also communicate peer-to-peer with another STA. In general, the AP 110 and the STA(s) 120 may form any suitable number of links for communication using any suitable frequencies and using any suitable communication protocols.

The AP 110 along with the STAs 120 associated with the AP 110 (e.g., within the coverage area (or cell) of the AP) may be referred to as a basic service set (BSS), which is managed by the respective AP 110. The BSS may be identified by STAs 120 and other devices by a service set identifier (SSID), as well as a basic service set identifier (BSSID). In some cases, the BSSID may be a media access control (MAC) address of the AP 110. The AP 110 may periodically broadcast beacon frames ("beacons") including the BSSID to enable any STAs 120 within range of the AP 110 to "associate" or "re-associate" with the AP 110 to establish a respective communication link, or to maintain a communication link, with the AP 110. For example, the beacons can include an identification or indication of a primary channel used by the respective AP 110 as well as a timing synchronization function (TSF) for establishing or maintaining timing synchronization with the AP 110.

In some cases, the AP 110 and the STAs 120 may operate and communicate according to one or more of the IEEE 802.11 family of wireless communication protocol standards. These standards define the WLAN radio and baseband protocols for the physical (PHY) and MAC layers. The AP 110 and the STAs 120 may transmit and receive wireless communications to and from one another in the form of PHY protocol data units (PPDUs) (also referred to herein as frames).

Each PPDU is generally a composite structure that includes a PHY preamble and a payload that is in the form of a PHY service data unit (PSDU). The information provided in the preamble may be used by a receiving device to decode the subsequent data in the PSDU. The PHY preamble may include both a legacy portion (or "legacy preamble") and a non-legacy portion (or "non-legacy preamble"). The legacy preamble may be used for packet detection, automatic gain control, and channel estimation, as illustrative, non-limiting examples. The legacy preamble may also be used to maintain compatibility with legacy devices. The format, coding, and information provided in the non-legacy portion of the preamble may be associated with the particular IEEE 802.11 wireless communication protocol to be used to transmit the payload.

In some cases, the AP 110 and STAs 120 may use OFDMA techniques to share the frequency resources of a TXOP. For example, to share its frequency resources, the AP 110 may partition the TXOP into multiple frequency segments each including respective frequency resources representing a portion of the TXOP. The AP 110 may allocate the frequency segments to one or more of the STAs 120 in scheduling information, e.g., for uplink or downlink communications with the associated STA(s) 120. In some examples of OFDMA techniques, each frequency segment includes a set of frequency resources that may not overlap with any frequency resources of any other frequency segment. In such examples, the scheduling information may include an indication of frequency resources, of multiple frequency resources of the TXOP, associated with each portion of the TXOP. For example, the scheduling information may include an indication of a bandwidth portion of the wireless channel such as an indication of one or more subchannels or resource units (RUs) associated with each portion of the TXOP such as for multi-user OFDMA.

The AP 110 can include one or more memory devices 112 (e.g., one or more non-transitory computer readable medium) and one or more processors 114. The one or more memory devices 112 can include instructions that, when executed by the one or more processors 114, cause the one or more processors 114 to perform one or more techniques described herein for mitigating (or even avoiding) UORA collisions for uplink transmissions.

The AP 110 can be communicatively coupled with a controller 130. The controller may be implemented by any device or system, and may be combined or distributed across any number of systems. For example, the controller 130 may be a WLAN controller (WLC) for the AP 110 within the network 100. In certain embodiments, the controller 130 may assist the AP 110 in performing one or more techniques described herein for mitigating (or even avoiding) UORA collisions for uplink transmissions. The controller 130 may include one or more memory devices 132 (e.g., one or more non-transitory computer readable medium) and one or more processors 134 that can facilitate assistance to the AP 110 in performing the techniques described herein. The controller 130 may communicate with the AP 110 via a (wired or wireless) backhaul. The AP may also communicate with another AP (not shown), e.g., directly or indirectly via a wireless or wireline backhaul.

In some examples, the controller 130 is included within or integrated with an AP, such as AP 110, and coordinates the links formed by that AP (and/or otherwise provides control for that AP). For example, each AP may include a respective controller that provides control for that AP. Example hardware that may be included in a controller 130, AP 110, or STA 120 is discussed in greater detail with regard to FIG. 8.

In certain cases, for uplink (UL), STAs 120 may communicate their traffic requirements to the AP 110, e.g., by transmitting regular buffer status reports (BSRs). To facilitate this, the network 100 (e.g., a wireless network supporting IEEE 802.11ax and/or later versions) may support two modes in which packets can be transmitted in the UL: (i) scheduled access (SA) and (ii) random access (RA). In SA mode, the AP 110 may schedule a set of STAs to transmit on dedicated contention-free RUs. In RA mode, multiple STAs may contend to transmit their packet using the exponential backoff-based Distributed Coordinated Function (DCF). In some cases, a STA may choose to bypass the SA mode of UL transmission to the medium and attempt RA with UORA.

In certain examples, a triggered uplink access scheme may involve the AP 110 transmitting a trigger frame to one or more STAs 120 during a TXOP. In some cases, the AP 110 may transmit the trigger frame after sensing the wireless channel is idle for a period of time (or time interval), such as a point coordination function (PCF) interframe space (PIFS). The AP may use the trigger frame to solicit a number of STAs and allocate resources for their uplink multi-user transmissions. For example, the trigger frame may include identifiers (e.g., association identities (AIDS)) of particular STA(s) 120 along with an indication of (i) the RU(s) allocated to the particular STA(s) 120 as part of SA mode, (ii) an indication of RU(s) associated with RA mode, or (iii) a combination thereof. After receiving the trigger frame, the particular STA(s) 120 may send uplink transmissions to the AP 110 on (i) their respective assigned RU(s), (ii) one of the RUs associated with RA mode, or (iii) a combination thereof. The AP may respond to the STAs using a multi-station block acknowledgment (MBA) to acknowledge successful packet reception.

Figure 2:
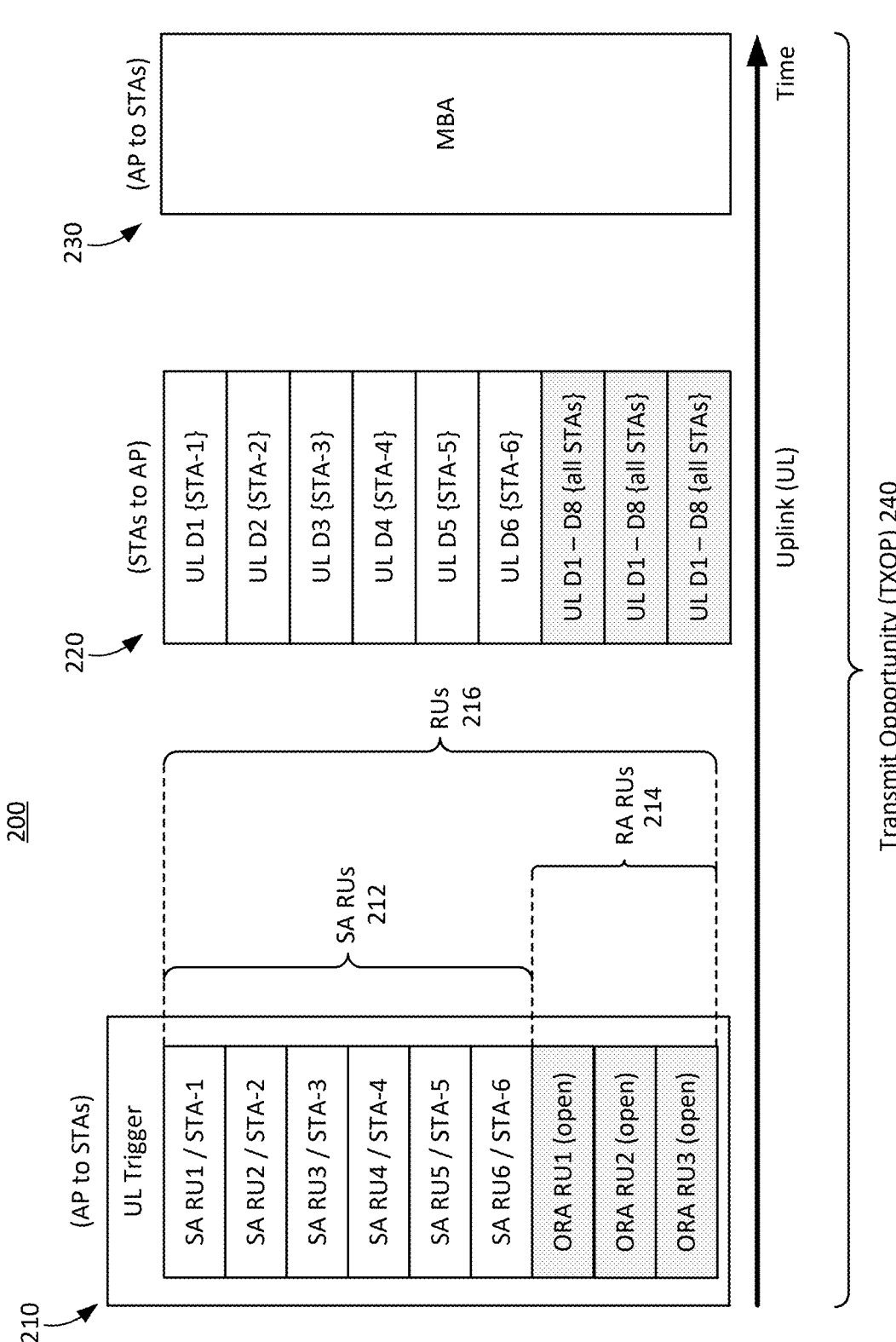
FIG. 2 illustrates an example triggered uplink access scheme, according to one embodiment.

FIG. 2 depicts an example triggered uplink access scheme 200 with a SA mode of UL transmission and an RA mode of UL transmission, according to one embodiment. As shown, during TXOP 240, the AP (e.g., AP 110) transmits an uplink trigger frame (e.g., UL trigger 210). Generally, the UL trigger 210 is generated by the AP to allocate resources and is transmitted to solicit one or more uplink PPDU transmissions from STAs 120 associated with the AP.

As illustrated in FIG. 2, the UL trigger 210 may include (or otherwise indicate) multiple RUs 216. In generating the UL trigger 210, an AP, such as the AP 110 of FIG. 1, can allocate or assign each one of the RUs 216 as a scheduled access resource unit (SA RU) 212 or a random access resource unit (RA RU) 214. Generally, each SA RU 212 may be a dedicated contention-free RU for a particular STA to transmit its UL data (or uplink transmission) in the uplink. In contrast, each RA RU 214 can provide a resource for STAs (e.g., STA(s) 120) to contend with one another to transmit their UL data.

In the depicted embodiment of FIG. 2, the UL trigger 210 allocates a first set of RUs 216 as SA RUs 212. The SA RUs 212 include a first SA RU (or SA RU1) dedicated to a first station STA-1 (e.g., STA 120-1), a second SA RU (or SA RU2) dedicated to a second station STA-2 (e.g., STA 120-2), a third SA RU (or SA RU3) dedicated to a third station STA-3 (e.g., STA 120-3), a fourth SA RU (or SA RU4) dedicated to a fourth station STA-4 (e.g., STA 120-4), a fifth SA RU (or SA RU5) dedicated to a fifth station STA-5 (e.g., STA 120-5), and a sixth SA RU (or SA RU6) dedicated to a sixth station STA-6 (e.g., STA 120-6).

As noted, the SA RUs 212 may provide their respective STAs dedicated contention-free resources to transmit their respective UL data. For example, as shown in FIG. 2, a triggered UL communication 220 is transmitted in response to the UL trigger 210. The triggered UL communication 220 may include a UL MU-OFDMA trigger-based (TB) PPDU that accommodates multiple RUs from multiple STAs. As part of the triggered UL communication 220, STA-1 may transmit first UL data (or UL D1) on its assigned SA RU1, STA-2 may transmit second UL data (or UL D2) on its assigned SA RU2, STA-3 may transmit third UL data (or UL D3) on its assigned SA RU3, STA-4 may transmit fourth UL data (or UL D4) on its assigned SA RU4, STA-5 may transmit fifth UL data (or UL D5) on its assigned SA RU5, and STA-6 may transmit sixth UL data (or UL D6) on its assigned SA RU6.

In addition to, or as an alternative to, allocating SA RUs, the UL trigger 210 may allocate RA RUs. In the depicted embodiment of FIG. 2, for example, the UL trigger 210 allocates a second set of RUs 216 as RA RUs 214. The RA RUs 214 include a first "open" RA RU (or ORA RU1), a second "open" RA RU (or ORA RU2), and a third "open" RA RU (or ORA RU3). Each of the RA RUs 214s is open to all STAs associated with the AP for contention-based UORA access and is not restricted to any particular subset of STAs. For example, assuming the AP has 8 total STAs associated therewith, e.g., as in FIG. 1, all 8 STAs would be eligible to contend for random access with the ORA RU1, ORA RU2, and ORA RU3 using UORA in order to transmit their respective uplink data UL D1 to UL D8.

As further illustrated in FIG. 2, after the triggered UL communication 220 is transmitted, the AP can transmit a MBA 230 that confirms to the STAs that the AP has received their uplink data. Note that while FIG. 2 depicts the UL trigger 210 allocating a certain number of SA RUs and a certain number of RA RUs, note that the UL trigger 210 can allocate any number of SA RUs and/or RA RUs.

Figure 3:
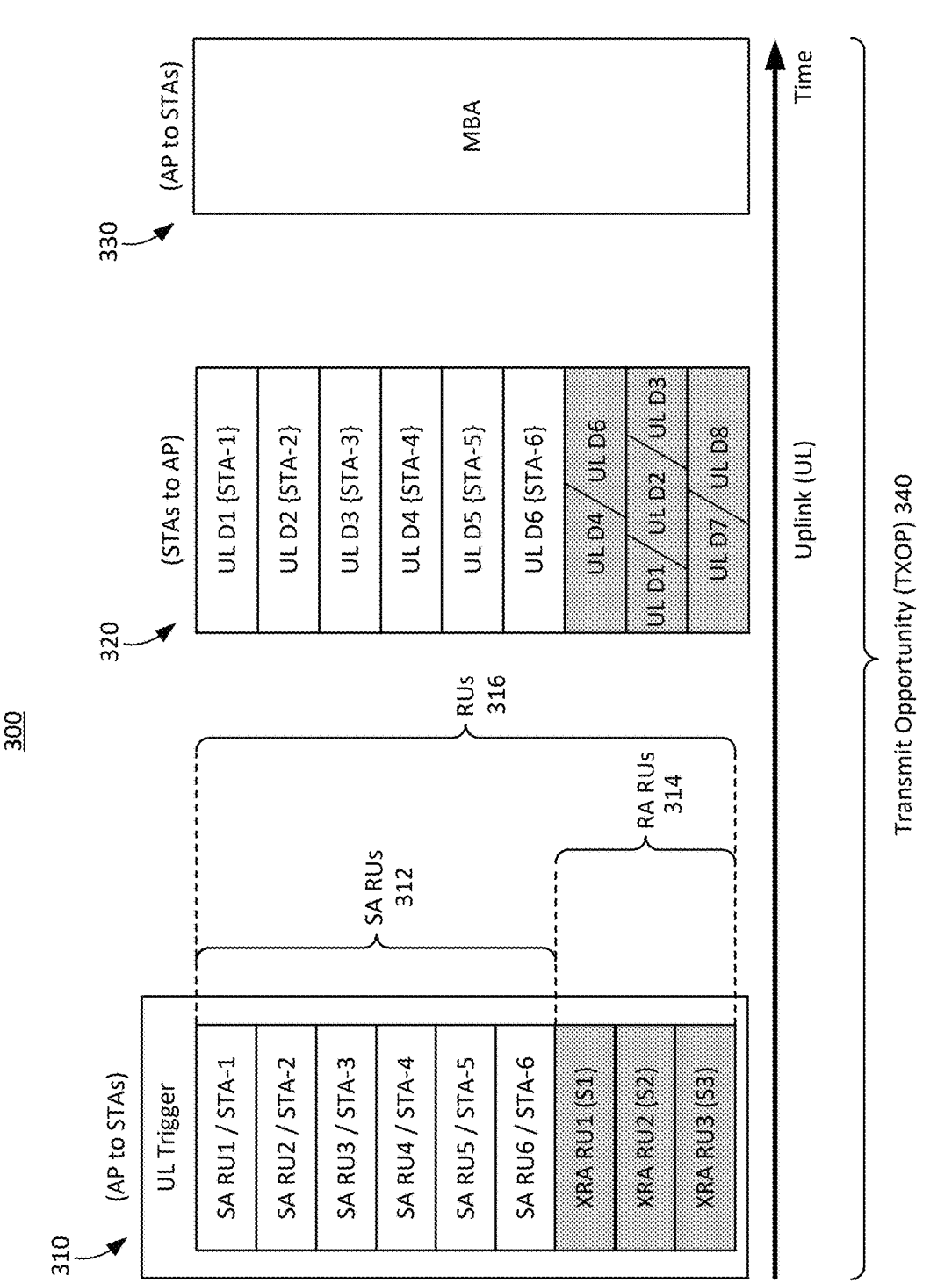
FIG. 3 illustrates another example triggered uplink access scheme, according to one embodiment.

FIG. 3 depicts another example triggered uplink access scheme 300 with a SA mode of UL transmission and an RA mode of UL transmission, according to one embodiment. As shown, during TXOP 340, the AP (e.g., AP 110) transmits an uplink trigger frame (e.g., UL trigger 310), e.g., to solicit one or more uplink PPDU transmissions from STAs 120 associated with the AP.

As illustrated in FIG. 3, the UL trigger 310 may include (or otherwise indicate) multiple RUs 316. The UL trigger 310 allocates a first set of RUs 316 as SA RUs 312, which may be similar to SA RUs 212 of FIG. 2. For example, each SA RU 312 may be a dedicated contention-free RU for a particular STA to transmit its UL data (or uplink transmission). As shown, as part of the triggered UL transmission 320 (e.g., uplink MU OFDMA transmission), the STAs 1-6 may transmit their respective UL data on their respective assigned SA RUs 312.

In addition to, or as an alternative to, allocating SA RUs, the UL trigger 310 may allocate RA RUs. In the depicted embodiment of FIG. 3, for example, the UL trigger 310 allocates a second set of RUs 316 as RA RUs 314. The RA RUs 314 include "restricted" RA RUs (referred to herein XRA RUs). Particularly, the RA RUs 314 include a first XRA RU (or XRA RU1), a second XRA RU (or XRA RU2), and a third XRA RU (or XRA RU3). Compared to an "open" RA RU, a "restricted" RA RU constrains UORA access to a subset of the STAs (e.g., STAs 120) being served by the AP. In the depicted embodiment of FIG. 3, for example, XRA RU1 restricts UORA access to a first subset S1 of the STAs that includes STA-4 (e.g., STA 120-4) and STA-6 (e.g., STA 120-6), XRA RU2 restricts UORA access to a second subset S2 of the STAs that includes STA-1 (e.g., STA 120-1), STA-2 (e.g., STA 120-2), and STA-3 (e.g., STA 120-3), and XRA RU3 restricts UORA access to a third subset S3 of the STAs that includes STA-7 (e.g., STA 120-7) and STA-8 (e.g., STA 120-8). Note, in general, a subset of STAs may include a same or different set of STAs as another subset. For example, the first subset S1, second subset S2, and third subset S3 may be disjoint subsets (e.g., the subsets have different sets of STAs with no common STA amongst the subsets) or may include one or more same STAs.

Each of the XRA RUs may restrict contention-based random access using UORA to the respective subset of STAs associated with the XRA RU. For example, assuming the AP has 8 total STAs associated therewith, contention-based UORA access with the XRA RU1 may be restricted to only the first subset S1 of STAs, contention-based UORA access with the XRA RU2 may be restricted to only the second subset S2 of STAs, and contention-based UORA access with the XRA RU3 may be restricted to only the third subset S3 of STAs. Accordingly, during the triggered UL transmission 320, STA-4 and STA-6 may contend with one another to transmit their respective uplink data UL D4 and UL D6 on XRA RU1 using UORA, STA-1, STA-2, and STA-3 may contend with one another to transmit their respective uplink data UL D1, UL D2, and UL D3 on XRA RU2 using UORA, and STA-7 and STA-8 may contend with one another to transmit their respective uplink data UL D7 and UL D8 on XRA RU3 using UORA.

As further illustrated in FIG. 3, after the triggered UL transmission 320 is transmitted, the AP can transmit a MBA 330 that confirms to the STAs that the AP has received their uplink data. Note that while FIG. 3 depicts the UL trigger 310 allocating a certain number of SA RUs and a certain number of XRA RUs, note that the UL trigger 310 can allocate any number of SA RUs and/or XRA RUs.

Note that the triggered uplink access schemes 200 and 300 depicted in FIGS. 2 and 3, respectively, are reference examples of triggered uplink access schemes and that other triggered uplink access schemes consistent with the functionality described herein may be used. For example, in certain embodiments, a triggered uplink access scheme may involve an AP transmitting a trigger frame (e.g., UL) that allocates a certain number of SA RUs, a certain number of ORA RUs, a certain number of XRA RUs, or any combination thereof.

One potential drawback to triggered uplink access schemes that involve UORA-based access is that there may a high likelihood of collisions between STAs attempting to access one of the RA-RUs (e.g., ORA RUs and/or XRA RUs). For example, with UORA, any device may choose to jump on (or access) one of the RA RUs and collide with another STA.

Certain embodiments described herein provide techniques for mitigating (and, in some cases, avoiding) UORA collisions for uplink transmissions in a wireless network. The uplink transmissions may include UL MU-MIMO transmissions, such as triggered UL communication 220 and coordinated transmission 320, as illustrative, non-limiting examples. In certain embodiments, an AP (e.g., AP 110) may use signaled access to control the number of STAs (e.g., STAs 120) as well as which STAs are permitted to use UORA to access the medium. For example, certain embodiments herein may provide an augmentation to UORA based on signaled access to the medium to avoid excessive collisions from random access on a per-RU basis.

In certain embodiments, the techniques described herein may allow for collision free UORA on a given RA RU when multiple users (e.g., STAs 120) transmit on the same RA RU. For example, for each MU group (e.g., MU-MIMO group), an order may be established such that each STA knows which user it is in the MU group. For example, one or more MU groups may be established, where each MU group includes a set of users.

Each user may receive an indication of (i) which MU group the user is assigned to, (ii) which UORA RU (e.g., RA RU 214 or RA RU 314) the MU group is assigned to, (iii) the user order (e.g., user positions) within the MU group, (iv) the number of spatial streams (SS) assigned to the user, (v) SS position(s) for each user position in the MU group, or (vi) any combination thereof. Each user may be limited to 1 SS. In other embodiments, at least one of the users may be assigned more than 1 SS. In certain cases, each user may select at least one of the number of SSs assigned to the user, based on the user order (or user positions). For example, assuming (i) the MU group includes user 1, user 2, and user 3, (ii) the user order is {user 1, user 2, and user 3}, and (iii) there are 3 total SSs {SS1, SS2, and SS3}, user 1 may select SS1, user 2 may select SS2, and user 3 may select SS3.

In certain embodiments, such indication(s) may be communicated to the STA via an 802.11 management frame (e.g., association frame, authentication frame, beacon frame, etc.), 802.11 control frame, 802.11 data frame, or a combination thereof. For example, the AP may transmit a frame (e.g., management frame, control frame, and/or data frame) that includes the indication(s). The frame may be transmitted prior to a trigger frame (e.g., UL trigger 210, UL trigger 310).

In certain embodiments, such indication(s) may be determined via a negotiation between the STAs and the AP (and/or controller for the AP). For example, the negotiation may involve an exchange of one or more frames between the STA(s) and the AP to determine one or more of the aforementioned indications.

In certain embodiments, at least one of the indication(s) is determined based on a function of the MAC address associated with the user. In one embodiment, for example, the user order within a given MU group may be established statically by an operation on the MAC address associated with the user. One reference example of a MAC address operation may have the following expression:

$$\mathrm{mod(MAC[0:1],maxSS)} \qquad (1)$$

where maxSS is the maximum number of spatial streams. The AP can form MU groups to reduce the likelihood of a collision on a spatial stream mapping. Each user may be limited to 1 SS or may be allocated more than one SS.

In certain embodiments, rather than establishing the user order in an MU group or by a static assignment based on MAC address, the maximum number of SS may be communicated in the trigger frame (e.g., in the Nc field or another field(s) of the trigger frame). In such embodiments, each user that is transmitting on a given UORA RU may randomly pick one of the SSs. While this approach may lead to some collisions, the likelihood of a collision occurring may be less than UL single-user (SU) RA. In these embodiments, each user may be limited to 1 SS or may be allocated more than one SS.

Figure 4:
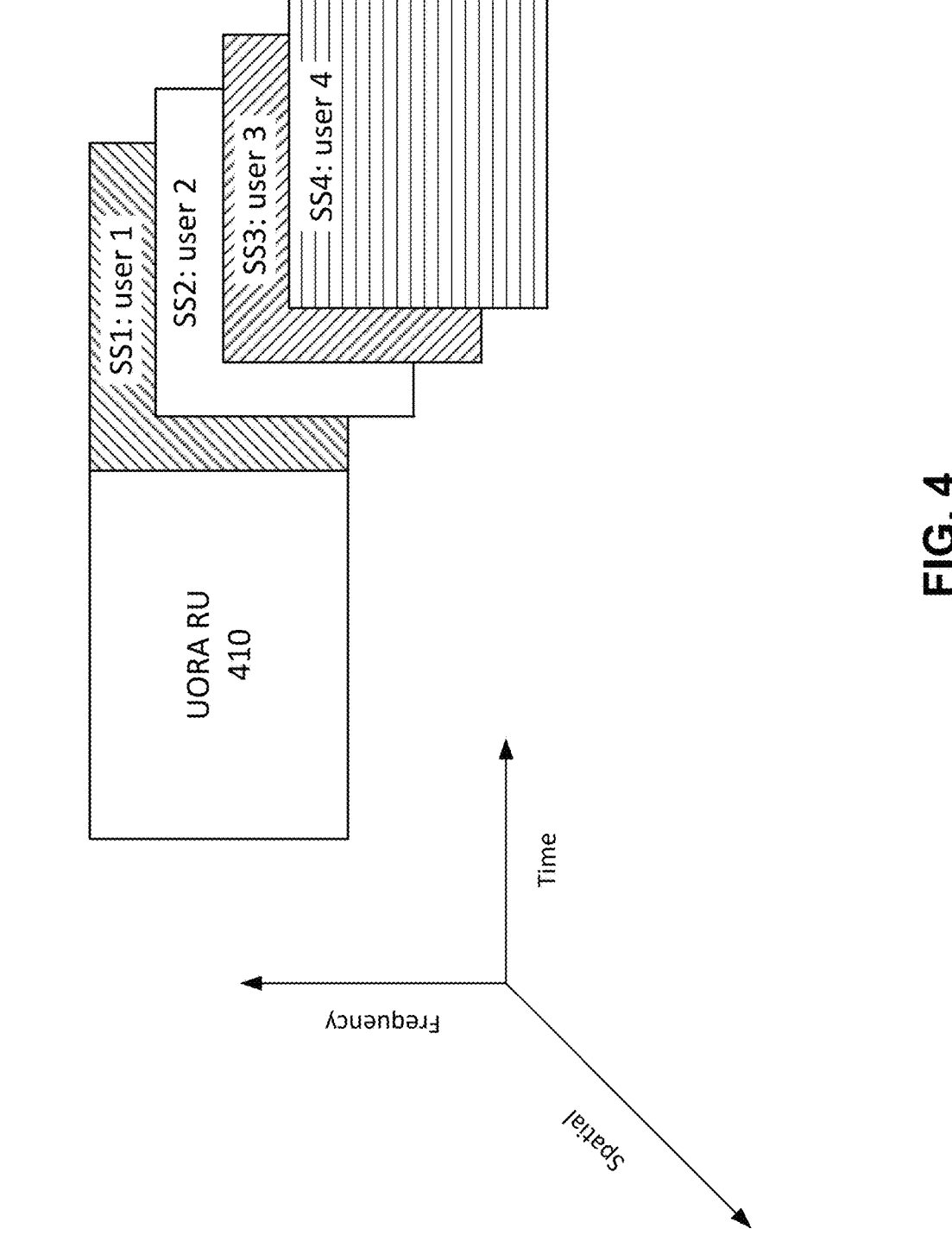
FIG. 4 illustrates an example scenario for reducing UORA collisions for uplink transmissions, according to one embodiment.

FIG. 4 depicts an example scenario 400 in which one or more techniques described herein are implemented to reduce UORA collisions on a UORA RU 410 (e.g., RA RU 214, RA RU 314, etc.), according to one embodiment. Here, for example, 4 users (e.g., STA 120-1, STA 120-2, STA 120-3, and STA 120-4) may be assigned to the same UORA RU 410 and may transmit on the same UORA RU 410. However, there is no collision between the users because each user selects a different spatial stream and transmits using the selected spatial stream.

Figure 5:
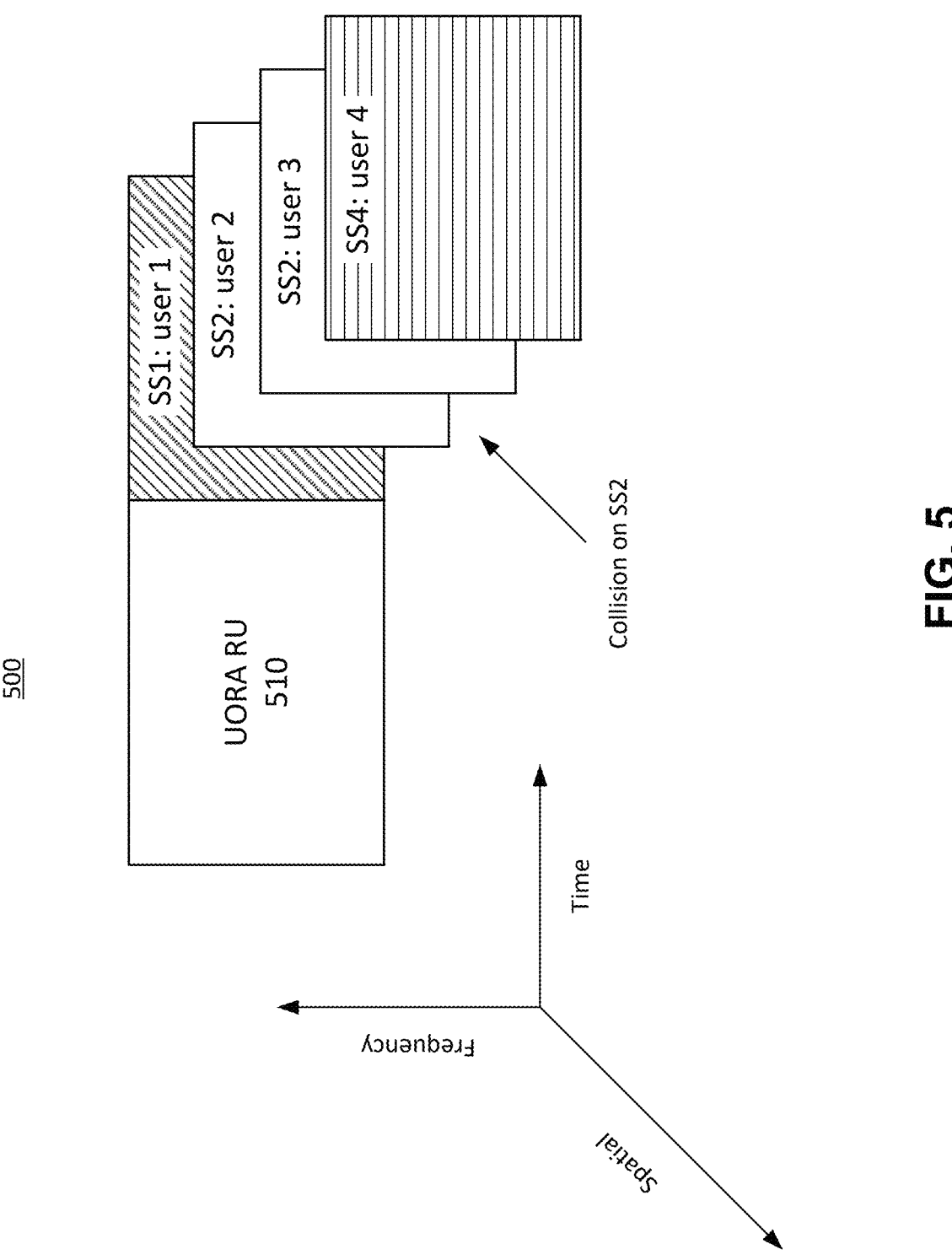
FIG. 5 illustrates another example scenario for reducing UORA collisions for uplink transmissions, according to one embodiment.

FIG. 5 depicts another example scenario 500 in which one or more techniques described herein are implemented to reduce UORA collisions on a UORA RU 510 (e.g., RA RU 214, RA RU 314, etc.), according to one embodiment. Here, 4 users may be assigned to the same UORA RU 510 and may transmit on the same UORA RU 510. However, there may be a collision between two users on SS 2 (e.g., user 2 and user 3) since the two users select the same SS (e.g., SS 2). Nevertheless, the likelihood of a collision occurring in scenario 500 may still be less than UL SU RA.

In certain embodiments, any triggered UORA uplink transmission in a RA RU that is restricted to a MU group may be sent in an OFDMA MU PPDU, where only that MU group can transmit on that RU. In some cases, regardless of how many users are participating in the group transmission, each member of the group may transmit as though a full spatial stream uplink MU frame is being transmitted.

In certain embodiments, any transmitting device may use the assigned long training field (LTF) positions that it would use as a user within that MU group for the triggered UORA uplink transmission. The transmission power may also be selected based on the previously transmitted packets and may be announced to the group via power control in the user info field of the trigger frame.

In certain embodiments, the triggered UORA uplink transmission may ensure that all PPDUs have the same duration and may remove the need for buffer status reporting before UL MU-MIMO which can limit the MAC efficiency of UL MU-MIMO.

Figure 6:
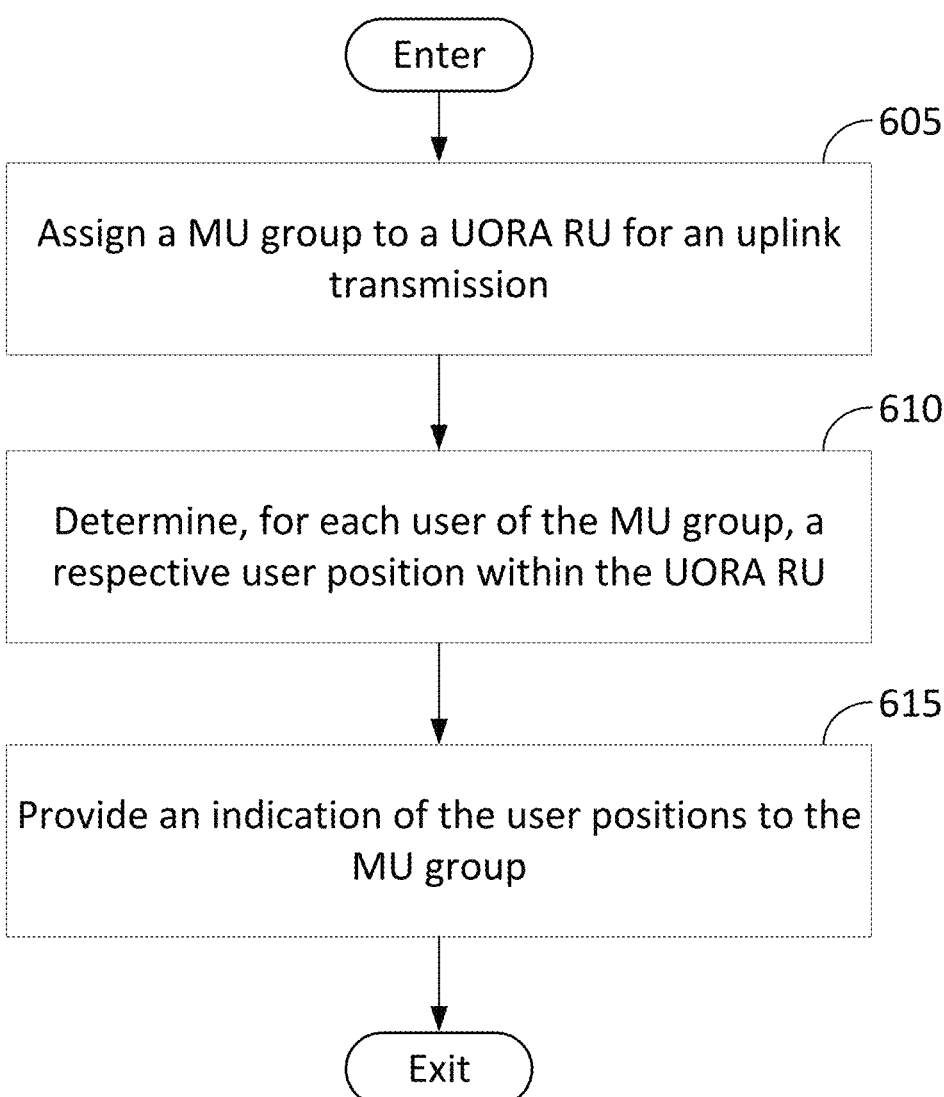
FIG. 6 is a flowchart of a method for reducing UORA collisions for uplink transmissions, according to one embodiment.

FIG. 6 is a flowchart of a method 600 for mitigating UORA collisions for uplink transmissions, according to one embodiment. The method 600 may be performed by a network entity, such as an AP (e.g., AP 110).

Method 600 may enter at block 605, where the network entity assigns a MU group to a UORA RU (e.g., UORA RU 410, UORA RU 510, etc.) for an uplink transmission. The MU group may include one or more users, such as one or more STAs (e.g., STA(s) 120).

At block 610, the network entity determines, for each user of the MU group, a respective user position within the UORA RU. In certain embodiments, each user position may be associated with one or more SS positions for the UORA RU.

At block 615, the network entity provides an indication of the user positions to the MU group. In certain embodiments, the network entity may transmit a frame (e.g., management frame, control frame, or data frame) including the indication. In some cases, such a frame may include an indication of the SS position(s) for each respective user position.

In general, the network entity may determine and provide information associated with UORA on at least one RU for an uplink transmission. Such information may include (i) an indication of the at least one RU, (ii) an indication of a group of users (e.g., MU group) assigned to the at least one RU, (iii) an order of users (e.g., user positions) within the MU group assigned to the at least one RU, (iv) a number of SSs assigned to each STA of the group of STAs assigned to the at least one RU, (v) SS positions of each user in the MU group, or (vi) any combination thereof. The AP may provide the information via one or more frames, including, but not limited to, uplink trigger frames, management frames, control frames, data frames, etc.

Figure 7:
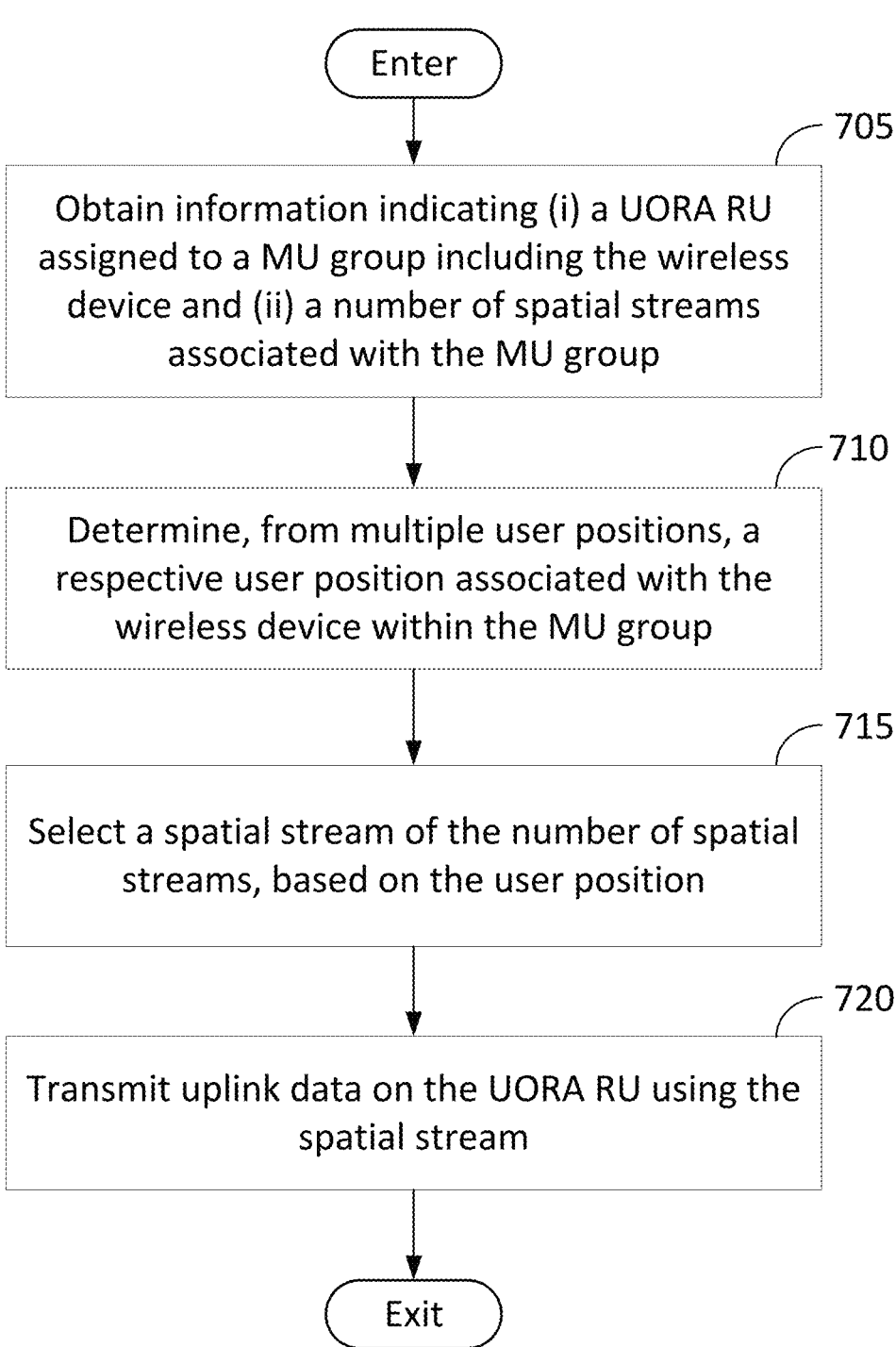
FIG. 7 is a flowchart of another method for reducing UORA collisions for uplink transmissions, according to one embodiment.

FIG. 7 is a flowchart of a method 700 for mitigating UORA collisions for uplink transmissions, according to one embodiment. The method 700 may be performed by a wireless device, such as a STA (e.g., STA 120).

Method 700 may enter at block 705, where the wireless device obtains information indicating (i) a UORA RU (e.g., UORA RU 410, UORA RU 510, etc.) assigned to a MU group including the wireless device and (ii) a number of SSs associated with the MU group. In certain embodiments, the information indicating the UORA RU and the number of SSs associated with the MU group may be obtained from an uplink trigger frame received by the wireless device from an AP associated with the wireless device.

At block 710, the wireless device determines, from multiple user positions, a respective user position associated with the wireless device within the MU group. Each user in the MU group may be associated with a different user position.

In certain embodiments, the wireless device may determine (at block 710) the respective user position based on a MAC address of the wireless device.

At block 715, the wireless device selects a SS of the number of SSs, based on the user position. In certain embodiments, each user position may be associated with a different SS of the number of SSs. In certain embodiments, at least one user position of the multiple user positions may be associated with multiple SSs of the number of SSs. In such embodiments, the method 700 may further involve the wireless device selecting another SS of the number of SSs, based on the respective user position, and transmitting the uplink data using the selected SSs.

At block 720, the wireless device transmits uplink data on the UORA RU using the SS. The uplink data may be transmitted within an OFDMA MU PPDU that includes the UORA RU.

In certain embodiments, the method 700 may further include obtaining information indicating (i) the user position associated with the wireless device within the MU group and (ii) the SS of the number of SSs associated with the user position. In such embodiments, the information may be obtained from a frame (e.g., management frame, control frame, or data frame) received by the wireless device from the AP. Such a frame may be received by the wireless device prior to an uplink trigger frame from the AP. In these embodiments, the wireless device may determine the respective user position (at block 710) and the respective SS (at block 715) based on the obtained information.

In general, the wireless device may obtain, from a network entity (e.g., AP 110), information associated with UORA on at least one RU for an uplink transmission. Such information may include (i) an indication of the at least one RU, (ii) an indication of a group of users (e.g., MU group) assigned to the at least one RU, (iii) an order of users (e.g., user positions) within the MU group assigned to the at least one RU, (iv) a number of SSs assigned to each STA of the group of STAs assigned to the at least one RU, (v) SS positions of each user in the MU group, or (vi) any combination thereof. The wireless device may obtain the information via one or more frames, including, but not limited to, uplink trigger frames, management frames, control frames, data frames, etc.

Figure 8:
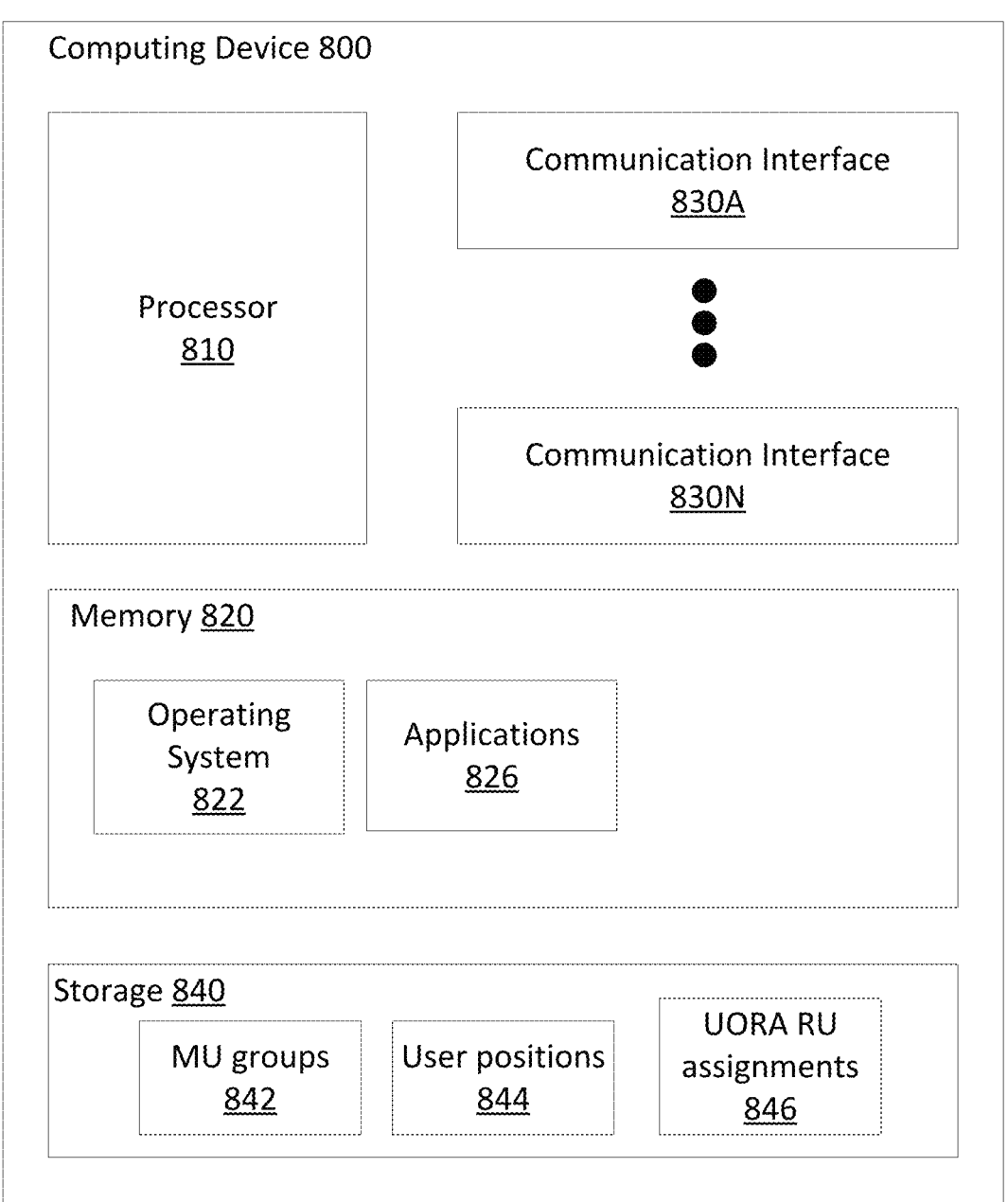
FIG. 8 illustrates an example computing device, according to one embodiment.

FIG. 8 illustrates an example computing device 800, according to one embodiment. The computing device 800 can be configured to perform one or more techniques described herein for reducing (or even avoiding) UORA collisions. For example, the computing device 800 can perform method 600, method 700, and any other techniques (or combination of techniques) described herein. The computing device 800 may be representative of a controller (e.g., controller 130), a network entity (e.g., an AP, such as AP 110), or a wireless device (e.g., a STA, such as STA 120). The computing device 800 includes, without limitation, a processor 810, a memory 820, one or more communication interfaces 830a-n, and storage 840. In one example, a communication interface 830 includes a radio.

The processor 810 may be any processing element capable of performing the functions described herein. The processor 810 represents a single processor, multiple processors, a processor with multiple cores, and combinations thereof. The communication interfaces 830 (e.g., radios) facilitate communications between the computing device 800 and other devices. The communications interfaces 830 may include wireless communications antennas and various wired communication ports.

The memory 820 may be either volatile or non-volatile memory and may include RAM, flash, cache, disk drives, and other computer readable memory storage devices. Although shown as a single entity, the memory 820 may be divided into different memory storage elements such as RAM and one or more hard disk drives. As shown, the memory 820 includes various instructions that are executable by the processor 810 to provide an operating system 822 to manage various functions of the computing device 800.

In some cases, the storage 840 may be a disk drive or flash storage device. In some cases, the storage 840 may be a combination of fixed and/or removable storage devices, such as fixed disc drives, solid state drives, removable memory cards, optical storage, network attached storage (NAS), or a storage area-network (SAN). The storage 840 may include one or more MU groups 842, user position(s) 844, UORA RU assignments 846, or any combination thereof, as illustrative, non-limiting examples.

EXAMPLE CLAUSES

In addition to the various embodiments described above, certain example embodiments are within the scope of the disclosure, some of which are detailed below:

Clause 1: A computer-implemented method performed by a wireless device, comprising: obtaining information indicating (i) an uplink orthogonal frequency division multiple access (OFDMA)-based random access (UORA) resource unit (RU) assigned to a multi-user (MU) group, the MU group comprising the wireless device and (ii) a number of spatial streams associated with the MU group; determining, from a plurality of user positions, a respective user position associated with the wireless device within the MU group; selecting a first spatial stream of the number of spatial streams, based on the user position; and transmitting uplink data on the UORA RU using the first spatial stream.

Clause 2: The computer-implemented method of Clause 1, wherein each user in the MU group is associated with a different user position.

Clause 3: The computer-implemented method according to any of Clauses 1-2, wherein each user position is associated with a different spatial stream of the number of spatial streams.

Clause 4: The computer-implemented method according to any of Clauses 1-3, wherein at least one user position of the plurality of user positions is associated with a plurality of spatial streams of the number of spatial streams.

Clause 5: The computer-implemented method according to any of Clauses 1-4, further comprising selecting a second spatial stream of the number of spatial streams, based on the respective user position, wherein the uplink data is further transmitted using the second spatial stream.

Clause 6: The computer-implemented method according to any of Clauses 1-5, wherein the user position is determined based on a media access control (MAC) address of the wireless device.

Clause 7: The computer-implemented method according to any of Clauses 1-6, wherein obtaining the information comprises receiving, from an access point (AP), an uplink trigger frame comprising the information.

Clause 8: The computer-implemented method according to any of Clauses 1-5 and 7, wherein the information further indicates the user position associated with the wireless device within the MU group and the first spatial stream of the number of spatial streams.

Clause 9: The computer-implemented method of Clause 8, wherein obtaining the information comprises receiving, from an access point (AP), a frame comprising at least a portion of the information.

Clause 10: The computer-implemented method of Clause 9, wherein the frame is a management frame, a control frame, or a data frame.

Clause 11: The computer-implemented method according to any of Clauses 1-10, wherein the uplink data is transmitted within an OFDMA MU physical protocol data unit (PPDU) comprising the UORA RU.

Clause 12: A wireless device comprising: one or more memories collectively storing instructions; and one or more processors communicatively coupled to the one or more memories, the one or more processors being collectively configured to execute the instructions to cause the wireless device to perform an operation comprising: obtaining information indicating (i) an uplink orthogonal frequency division multiple access (OFDMA)-based random access (UORA) resource unit (RU) assigned to a multi-user (MU) group of users, the MU group comprising the wireless device and (ii) a number of spatial streams associated with the MU group of users; determining, from a plurality of user positions, a respective user position associated with the wireless device within the MU group; selecting a first spatial stream of the number of spatial streams, based on the user position; and transmitting uplink data on the UORA RU using the first spatial stream.

Clause 13: The wireless device of Clause 12, wherein each user in the MU group is associated with a different user position.

Clause 14: The wireless device according to any of Clauses 12-13, wherein each user position is associated with a different spatial stream of the number of spatial streams.

Clause 15: The wireless device according to any of Clauses 12-14, the operation further comprising selecting a second spatial stream of the number of spatial streams, based on the respective user position, wherein the uplink data is further transmitted using the second spatial stream.

Clause 16: The wireless device according to any of Clauses 12-15, wherein the user position is determined based on a media access control (MAC) address of the wireless device.

Clause 17: A computer-implemented method by a network entity comprising: assigning a multi-user (MU) group to an uplink orthogonal frequency division multiple access (OFDMA)-based random access (UORA) resource unit (RU) for an uplink transmission; determining, for each user of the MU group, a respective user position within the UORA RU; and providing an indication of the user positions to the MU group.

Clause 18: The computer-implemented method of Clause 17, wherein each user position is associated with one or more spatial stream positions for the UORA RU.

Clause 19: The computer-implemented method according to any of Clauses 17-18, wherein providing the indication comprises transmitting a frame comprising the indication.

Clause 20: The computer-implemented method of Clause 19, wherein the frame is a management frame, a control frame, or a data frame.

Clause 21: A computing device comprising: one or more memories collectively storing instructions; and one or more processors communicatively coupled to the one or more memories, the one or more processors being collectively configured to execute the instructions to cause the computing device to perform a computer-implemented method in accordance with any of Clauses 1-11.

Clause 22: An apparatus, comprising means for performing a computer-implemented method in accordance with any of Clauses 1-11.

Clause 23: A non-transitory computer-readable medium storing executable instructions that, when executed by one or more processors of a computing device, cause the computing device to perform a computer-implemented method in accordance with any of Clauses 1-11.

Clause 24: A computing device comprising: one or more memories collectively storing instructions; and one or more processors communicatively coupled to the one or more memories, the one or more processors being collectively configured to execute the instructions to cause the computing device to perform a computer-implemented method in accordance with any of Clauses 17-20.

Clause 25: An apparatus, comprising means for performing a computer-implemented method in accordance with any of Clauses 17-20.

Clause 26: A non-transitory computer-readable medium storing executable instructions that, when executed by one or more processors of a computing device, cause the computing device to perform a computer-implemented method in accordance with any of Clauses 17-20.

As used herein, "a processor," "at least one processor," or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory," or "one or more memories" generally refers to a single memory configured to store data and/or instructions or multiple memories configured to collectively store data and/or instructions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method performed by a wireless device, comprising:
obtaining information indicating (i) an uplink orthogonal frequency division multiple access (OFDMA)-based random access (UORA) resource unit (RU) assigned to a multi-user (MU) group, the MU group comprising the wireless device and (ii) a number of spatial streams associated with the MU group;
determining, from a plurality of user positions, a respective user position associated with the wireless device within the MU group;
selecting a first spatial stream of the number of spatial streams, based on the respective user position associated with the wireless device; and
transmitting uplink data on the UORA RU using the first spatial stream.

2. The computer-implemented method of claim 1, wherein each user in the MU group is associated with a different user position.

3. The computer-implemented method of claim 2, wherein each user position is associated with a different spatial stream of the number of spatial streams.

4. The computer-implemented method of claim 1, wherein at least one user position of the plurality of user positions is associated with a plurality of spatial streams of the number of spatial streams.

5. The computer-implemented method of claim 1, further comprising selecting a second spatial stream of the number of spatial streams, based on the respective user position associated with the wireless device, wherein the uplink data is further transmitted using the second spatial stream.

6. The computer-implemented method of claim 1, wherein the user position is determined based on a media access control (MAC) address of the wireless device.

7. The computer-implemented method of claim 1, wherein obtaining the information comprises receiving, from an access point (AP), an uplink trigger frame comprising the information.

8. The computer-implemented method of claim 1, wherein the information further indicates the respective user position associated with the wireless device within the MU group and the first spatial stream of the number of spatial streams.

9. The computer-implemented method of claim 8, wherein obtaining the information comprises receiving, from an access point (AP), a frame comprising at least a portion of the information.

10. The computer-implemented method of claim 9, wherein the frame is a management frame, a control frame, or a data frame.

11. The computer-implemented method of claim 1, wherein the uplink data is transmitted within an OFDMA MU physical protocol data unit (PPDU) comprising the UORA RU.

12. A wireless device comprising:
one or more memories collectively storing instructions; and one or more processors communicatively coupled to the one or more memories, the one or more processors being collectively configured to execute the instructions to cause the wireless device to perform an operation comprising:
   obtaining information indicating (i) an uplink orthogonal frequency division multiple access (OFDMA)-based random access (UORA) resource unit (RU) assigned to a multi-user (MU) group of users, the MU group comprising the wireless device and (ii) a number of spatial streams associated with the MU group of users;
   determining, from a plurality of user positions, a respective user position associated with the wireless device within the MU group;
   selecting a first spatial stream of the number of spatial streams, based on the respective user position associated with the wireless device; and
   transmitting uplink data on the UORA RU using the first spatial stream.

13. The wireless device of claim 12, wherein each user in the MU group is associated with a different user position.

14. The wireless device of claim 13, wherein each user position is associated with a different spatial stream of the number of spatial streams.

15. The wireless device of claim 12, the operation further comprising selecting a second spatial stream of the number of spatial streams, based on the respective user position, wherein the uplink data is further transmitted using the second spatial stream.

16. The wireless device of claim 12, wherein the user position is determined based on a media access control (MAC) address of the wireless device.

17. A computer-implemented method by a network entity comprising:
   assigning a multi-user (MU) group to an uplink orthogonal frequency division multiple access (OFDMA)-based random access (UORA) resource unit (RU) for an uplink transmission;
   determining, for each user of the MU group, a respective user position within the UORA RU; and
   providing an indication of each respective user position to the MU group.

18. The computer-implemented method of claim 17, wherein each respective user position is associated with one or more spatial stream positions for the UORA RU.

19. The computer-implemented method of claim 17, wherein providing the indication comprises transmitting a frame comprising the indication.

20. The computer-implemented method of claim 19, wherein the frame is a management frame, a control frame, or a data frame.

* * * * *